UNITED STATES PATENT OFFICE.

CHARLES M. HALL, OF NIAGARA FALLS, NEW YORK.

PROCESS OF PURIFYING BAUXITE.

SPECIFICATION forming part of Letters Patent No. 678,732, dated July 16, 1901.

Application filed December 21, 1900. Serial No. 40,650. (No specimens.)

*To all whom it may concern:*

Be it known that I, CHARLES M. HALL, of Niagara Falls, in the county of Niagara and State of New York, have invented a new and useful Process of Purifying Bauxite or other Impure Oxid of Aluminium, of which the following is a full, clear, and exact description.

The object of my invention is to provide cheap and efficient means for eliminating silica from bauxite or other impure oxid of aluminium and thus fit it for use as an ore for the production of aluminium. I have discovered that this can be done by fusing the bauxite or impure oxid of aluminium together with a metallic fluorid or with two or more such fluorids in less proportion than the oxid to be treated.

In this process the elimination of the silica is accomplished by combination of the silicon with the fluorin of the fused fluorid, forming silicon fluorid, which escapes into the atmosphere as a gas. Having calcined the bauxite to remove the water, I mix it with fluorspar, cryolite, or other fusible fluorid in such proportion, preferably, as to give four atoms of fluorin for each atom of silicon contained in the bauxite. Thus three parts of silica in the bauxite require eight parts of fluorspar or seven parts of cryolite. These proportions may be varied; but the fluorids used should not be in greater proportion than the bauxite to be fused. The mixture of fluorid and the bauxite is then placed in a suitable electric furnace and fused therein. I may use either a direct or an alternating current at an electromotor force of, say, from twenty-five to thirty volts, with a suitable volume, or I may heat the materials by use of an electric arc. I subject the mass to the fusing action of the current for some time, depending upon the size of the operation. When working on a small scale, I have found one hour sufficient. During this time by the action of the fluorid the silica is removed in the form of silicon fluorid according to the following reaction, which takes place when fluorspar is used: $SiO_2 + 2CaF_2 = SiF_4 + 2CaO$. A like reaction takes place, to some extent at least, with the titanic acid, and when fluorids other than fluorspar are employed the operation is similar. If it is desired to remove the iron, I may accomplish that result by adding carbon to the bauxite. When the reaction is complete, the mass is allowed to cool and is taken from the furnace for use.

While the operation is proceeding the melted alumina should be well covered. This may be done with a layer of unfused bauxite, which may in its turn be melted, or toward the end of the operation it may be covered with a layer of carbon or previously-purified alumina.

I claim—

1. The method herein described of removing silica from bauxite or other impure oxid of aluminium, which consists in fusing the same together with a metallic fluorid which is present in less proportion than the material to be treated, substantially as described.

2. The method herein described of purifying bauxite or other impure oxid of aluminium, which consists in fusing the same together with fluorspar which is present in less proportion than the material to be treated; substantially as described.

In testimony whereof I have hereunto set my hand.

CHARLES M. HALL.

Witnesses:
H. M. CORWIN,
GEO. B. BLEMING.